US006967702B2

(12) United States Patent
Ishii et al.

(10) Patent No.: US 6,967,702 B2
(45) Date of Patent: Nov. 22, 2005

(54) LIQUID CRYSTAL DISPLAY DEVICE

(75) Inventors: Toshiya Ishii, Kanagawa (JP); Michiaki Sakamoto, Kanagawa (JP); Kiyomi Hayakawa, Kanagawa (JP)

(73) Assignee: NEC LCD Technologies, Ltd., Kanagawa (JP)

(*) Notice: Subject to any disclaimer, the term of this patent is extended or adjusted under 35 U.S.C. 154(b) by 0 days.

(21) Appl. No.: 10/633,219

(22) Filed: Aug. 1, 2003

(65) Prior Publication Data

US 2004/0070714 A1 Apr. 15, 2004

(30) Foreign Application Priority Data

Aug. 1, 2002 (JP) ....................................... 2002-224997

(51) Int. Cl.[7] ............................................. G02F 1/1335
(52) U.S. Cl. ......................... 349/123; 349/114; 349/130
(58) Field of Search ................................ 349/114, 130, 349/129

(56) References Cited

U.S. PATENT DOCUMENTS

| | | | | |
|---|---|---|---|---|
| 6,195,140 B1 | | 2/2001 | Kubo et al. | |
| 6,384,889 B1 | | 5/2002 | Miyachi et al. | |
| 6,784,963 B2 | * | 8/2004 | Park | 349/129 |
| 6,788,375 B2 | * | 9/2004 | Ogishima et al. | 349/130 |
| 2001/0020991 A1 | * | 9/2001 | Kubo et al. | 349/113 |
| 2002/0039166 A1 | | 4/2002 | Song | |

FOREIGN PATENT DOCUMENTS

| | | |
|---|---|---|
| CN | 1209565 | 3/1999 |
| CN | 1354383 | 6/2002 |
| JP | 6-043461 | 2/1994 |
| JP | 11-101992 | 4/1999 |
| JP | 2000-029010 | 1/2000 |
| JP | 2000-035570 | 2/2000 |
| JP | 2000-250056 | 9/2000 |
| JP | 2002-098951 | 4/2002 |
| JP | 2002-107724 | 4/2002 |

OTHER PUBLICATIONS

Chinese Office Action dated Feb. 18, 2005.

* cited by examiner

*Primary Examiner*—Kenneth Parker
*Assistant Examiner*—(Nancy) Thanh-Nhan P Nguyen
(74) *Attorney, Agent, or Firm*—Katten Muchin Zavis Rosenman

(57) ABSTRACT

A liquid crystal display device includes (a) a first substrate including a first area in which an incident light is reflected and a second area through which a light passes, and further including a pixel electrode covering the first and second areas therewith, (b) a second substrate including at least an opposing electrode, (c) a liquid crystal layer sandwiched between the first and second substrates and including liquid crystal molecules each having a major axis aligned perpendicularly to the first and second substrates when no electric field is applied thereto, and (d) a first alignment-controller for controlling alignment of the liquid crystal molecules, the first alignment-controller being arranged at a boundary of the first and second areas or in the vicinity of the boundary.

20 Claims, 16 Drawing Sheets

LIQUID CRYSTAL DISPLAY DEVICE

BACKGROUND OF THE INVENTION

1. Field of the Invention

The invention relates to a liquid crystal display device, and more particularly to a half-transmission type liquid crystal display device having functions of a light-transmission type liquid crystal display device and a light-reflection type liquid crystal display device.

2. Description of the Related Art

A liquid crystal display device is generally comprised of two substrates and liquid crystal sandwiched between the two substrates, in which an intensity of electric field to be applied to the liquid crystal is controlled to thereby control a degree at which backlight passes through the liquid crystal.

A vertical-alignment type liquid crystal display device can completely shut out a light when no electric field is applied thereto. Namely, since a luminance in off-condition in a normally black mode is quite low, a vertical-alignment type liquid crystal display device can present a high contrast ratio in comparison with a conventional twisted nematic type liquid crystal display device.

In general, backlight consumes 50% or more among power consumed in a liquid crystal display device. Hence, a portable communication device is often designed to include a light-reflection type liquid crystal display device which includes a light-reflector in place of a backlight source for displaying images only by incident lights.

However, a light-reflection type liquid crystal display device is accompanied with a problem that displayed images cannot be seen when it is dark around the device.

As a solution to the problem, there has been suggested a half-transmission type liquid crystal display device including a light-reflection area and a light-transmission area, as a liquid crystal display device having advantages of both of a light-reflection type liquid crystal display device and a light-transmission type liquid crystal display device. For instance, Japanese Patent No. 2955277 has suggested such a half-transmission type liquid crystal display device.

FIG. 1 is a cross-sectional view of a first example of a conventional half-transmission type liquid crystal display device.

A half-transmission type liquid crystal display device 100 illustrated in FIG. 1 is comprised of a first substrate 101, a second substrate 102, and a liquid crystal layer 103 sandwiched between the first and second substrates 101 and 102.

The second substrate 102 is comprised of a second electrically insulating transparent substrate 104, an opposing electrode 105 composed of ITO (indium tin oxide) formed on the second transparent substrate 104 in facing relation to the liquid crystal layer 103, an alignment film 106 formed on the opposing electrode 105, an optical compensator 107 formed on the second transparent substrate 104 in opposite side with respect to the liquid crystal layer 103, and a polarizer 108 formed on the optic compensator 107.

The half-transmission type liquid crystal display device 100 is designed to have a first area 120 in which a light is reflected and a second area 121 through which a light passes. A structure of the first substrate 101 in the first area 120 is different from a structure of the first substrate 101 in the second area 121.

In the first area 120, the first substrate 101 is comprised of a first electrically insulating transparent substrate 109, a passivation film 110 formed on the first transparent film 109 in facing relation to the liquid crystal layer 103, a pixel electrode 111 composed of ITO and formed on the passivation film 110, a dielectric layer 112 formed on the pixel electrode 111 and having a wavy surface, a pixel electrode 113 covering the dielectric layer 112 therewith in wavy configuration and composed of aluminum, an alignment film 114 covering the pixel electrode 113 therewith, an optical compensator 115 formed on the first transparent substrate 109 in opposite side with respect to the liquid crystal layer 103, and a polarizer 116 formed on the optic compensator 115.

In the second area 121, the first substrate 101 is comprised of a first electrically insulating transparent substrate 109, a passivation film 110 formed on the first transparent film 109 in facing relation to the liquid crystal layer 103, a pixel electrode 111 composed of ITO and formed on the passivation film 110, an alignment film 114 formed on the pixel electrode 111, an optical compensator 115 formed on the first transparent substrate 109 in opposite side with respect to the liquid crystal layer 103, and a polarizer 116 formed on the optic compensator 115.

In the half-transmission type liquid crystal display device 100, liquid crystal molecules constituting the liquid crystal layer 103 are aligned so that major axes of them are perpendicular to the first and second substrates 101 and 102 when no electric field is applied to the liquid crystal display device 100. The liquid crystal molecules have negative dielectric anisotropy.

FIG. 2 is a cross-sectional view of a second example of a conventional half-transmission type liquid crystal display device.

A half-transmission type liquid crystal display device 150 illustrated in FIG. 2 is different from the half-transmission type liquid crystal display device 100 illustrated in FIG. 1 in a structure of the first substrate 101 in the first area 120.

That is, in the half-transmission type liquid crystal display device 150, the pixel electrode 113 composed of aluminum is covered with the pixel electrode 111 composed of ITO, and the alignment film 114 is formed on the pixel electrode 111. Except this difference, the half transmission type liquid crystal display device 150 is identical in structure to the half-transmission type liquid crystal display device 100.

The half-transmission type liquid crystal display device 100 illustrated in FIG. 1 displays images as follows.

In the first area 120, an external light enters the half-transmission type liquid crystal display device 100, and is reflected at the pixel electrode 113 acting as a reflector. Then, the reflected light passes through the liquid crystal layer 103 and the second substrate 102, and reaches a viewer.

In the second area 121, a backlight emitted from a backlight source (not illustrated) arranged below the first transparent substrate 109 passes through the first substrate 101, the liquid crystal layer 103 and the second substrate 102, and reaches a viewer.

As mentioned above, whereas an incident light reciprocates the liquid crystal layer 103 in the first area 120, an incident light passes through the liquid crystal layer 103 only in one-way in the second area 121, resulting in an optical path difference in the liquid crystal layer 103. In order to avoid such an optical path difference, a cell gap Dr of liquid crystal in the first area 120 is designed to be about half of a cell gap Df of liquid crystal in the second area 121, thereby optimizing an intensity of an output light caused by a difference in retardation between the first and second areas 120 and 121.

For instance, the cell gaps Dr and Df are designed equal to 2 $\mu$m and 4 $\mu$m, respectively.

The half-transmission type liquid crystal display device 150 illustrated in FIG. 2 displays images in the same way as the half-transmission type liquid crystal display device 100.

In order to make use of advantages provided by the above-mentioned half-transmission type liquid crystal display device and vertical-alignment type liquid crystal display device, Japanese Patent Application Publications Nos. 2000-29010 and 2000-35570 suggest a liquid crystal display device having function of both of half-transmission type and vertical-alignment type liquid crystal display devices.

A half transmission type liquid crystal display device having the first and second areas unavoidably has the cell gaps Dr and Df different from each other, in order to avoid the above-mentioned optical path difference in the liquid crystal layer 103.

However, the cell gaps Dr and Df different from each other cause a problem that liquid crystal molecules are inclined in non-uniform directions at a boundary between the first and second areas and in the vicinity of the boundary when electric field is applied to the liquid crystal layer, resulting in deterioration in visibility and reduction in a response speed.

Japanese Patent No. 2565639, based on U.S. patent application Ser. No. 879,256 filed on Apr. 30, 1992, has suggested a liquid crystal display device including a common electrode formed on a substrate. The common electrode is formed in alignment with a display area with a patterned opening for dividing the display area into a plurality of liquid crystal domains, and covers the substrate therewith in an area other than the opening.

Japanese Patent Application Publication No. 2000-250056 has suggested a liquid crystal display device including a pixel electrode formed with an opening in the form of a slit and in parallel with an orientation of alignment of liquid crystal molecules.

Japanese Patent Application Publication No. 2002-107724 has suggested a liquid crystal display device including a λ/4 double-refraction layer arranged between a light-reflection layer and a liquid crystal layer to thereby equalize a thickness of the liquid crystal layer in a light-reflection area to a thickness of the liquid crystal layer in a light-transmission area.

Japanese Patent Application Publication No. 2002-98951 has suggested a half-transmission type liquid crystal display device including a reflection electrode having a patterned opening having a side which is not in parallel with any sides of an effective frame of a liquid crystal display panel and any sides of a pixel pattern.

SUMMARY OF THE INVENTION

In view of the above-mentioned problems in the conventional liquid crystal display devices, it is an object of the present invention to provide a vertical-alignment type liquid crystal display device including a first area in which an incident light is reflected and a second area through which a light passes which device is capable of preventing deterioration in visibility and reduction in a response speed both of which are caused by a difference in cell gap found at a boundary between and in the vicinity of the first and second areas.

In one aspect of the present invention, there is provided a liquid crystal display device including (a) a first substrate including a first area in which an incident light is reflected and a second area through which a light passes, and further including a pixel electrode covering the first and second areas therewith, (b) a second substrate including at least an opposing electrode, (c) a liquid crystal layer sandwiched between the first and second substrates and including liquid crystal molecules each having a major axis aligned perpendicularly to the first and second substrates when no electric field is applied thereto, and (d) a first alignment-controller for controlling alignment of the liquid crystal molecules, the first alignment-controller being arranged at a boundary of the first and second areas or in the vicinity of the boundary.

The liquid crystal display device may further include a second alignment-controller for controlling alignment of the liquid crystal molecules, the second alignment-controller being formed in the second substrate in facing relation to the first and second areas.

For instance, the first alignment-controller is comprised of an opening area of the first substrate where the pixel electrode does not exist.

As an alternative, the first alignment-controller may be comprised of a projection formed on the pixel electrode on the first substrate, the projection being composed of dielectric substance.

It is preferable that a cell gap above the first area and a cell gap above the second area are different from each other.

It is preferable that the first substrate has a level-different portion between the first and second areas.

For instance, the opening area is located in the first area.

For instance, the opening area is located at a boundary between the first and second areas.

For instance, the opening area is located in the second area.

For instance, the projection is located in the first area.

For instance, the projection is located in the second area.

For instance, the second alignment-controller is comprised of a second opening area of the second substrate where the opposing electrode does not exist.

It is preferable that the pixel electrode is formed with at least one opening area for dividing the pixel electrode into a plurality of sections in the first and second areas, the second alignment-controller is comprised of a second opening area of the second substrate where the opposing electrode does not exist, the opposing electrode is formed with two second opening areas each in facing relation to the pixel electrode in the first area and the pixel electrode in the second area.

It is preferable that the pixel electrode is formed with at least one opening area for dividing at least a part of the pixel electrode into a plurality of sections in the first and second areas, the second alignment-controller is comprised of a second opening area of the second substrate where the opposing electrode does not exist, the opposing electrode is formed with a plurality of second opening areas in facing relation to each of the sections and/or a non-divided portion of the pixel electrode.

It is preferable that each of the second opening area and the pixel electrode is symmetrical about a longitudinal direction of the liquid crystal display device.

It is preferable that each of the sections in the first area is larger in area than each of the sections in the second area.

It is preferable that the opening area extends across a boundary between the first and second areas, and the pixel electrode in the first area is connected to the pixel electrode in the second area through at least one line-shaped pixel electrode.

It is preferable that the opening area is formed in one of the first and second areas, and is comprised of a first region located adjacent to the first or second area, a second region spaced away from the first region, and at least one line-shaped connection region connecting the first and second regions to each other.

For instance, the second opening area is comprised of a cross slit.

It is preferable that a center of the second opening area is in alignment with a center of the pixel electrode.

The advantages obtained by the aforementioned present invention will be described hereinbelow.

The present invention makes it possible in a liquid crystal display device including a first area in which an incident light is reflected and a second area through which a light passes to prevent deterioration in visibility and reduction in a response speed both of which are caused by a difference in cell gap found at a boundary between and in the vicinity of the first and second areas.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
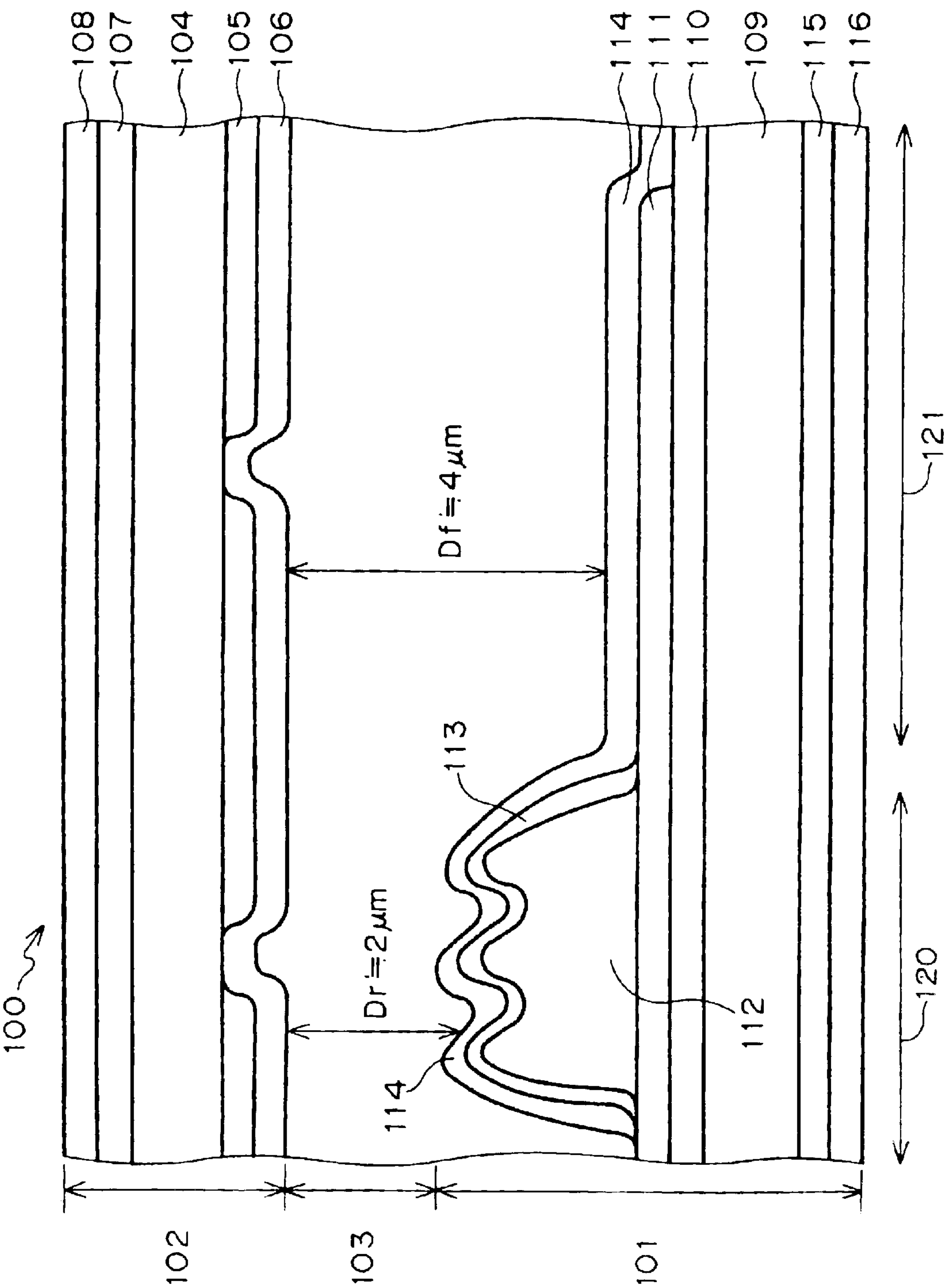
FIG. 1 is a cross-sectional view of a first example of a conventional half-transmission type liquid crystal display device.
Figure 2:
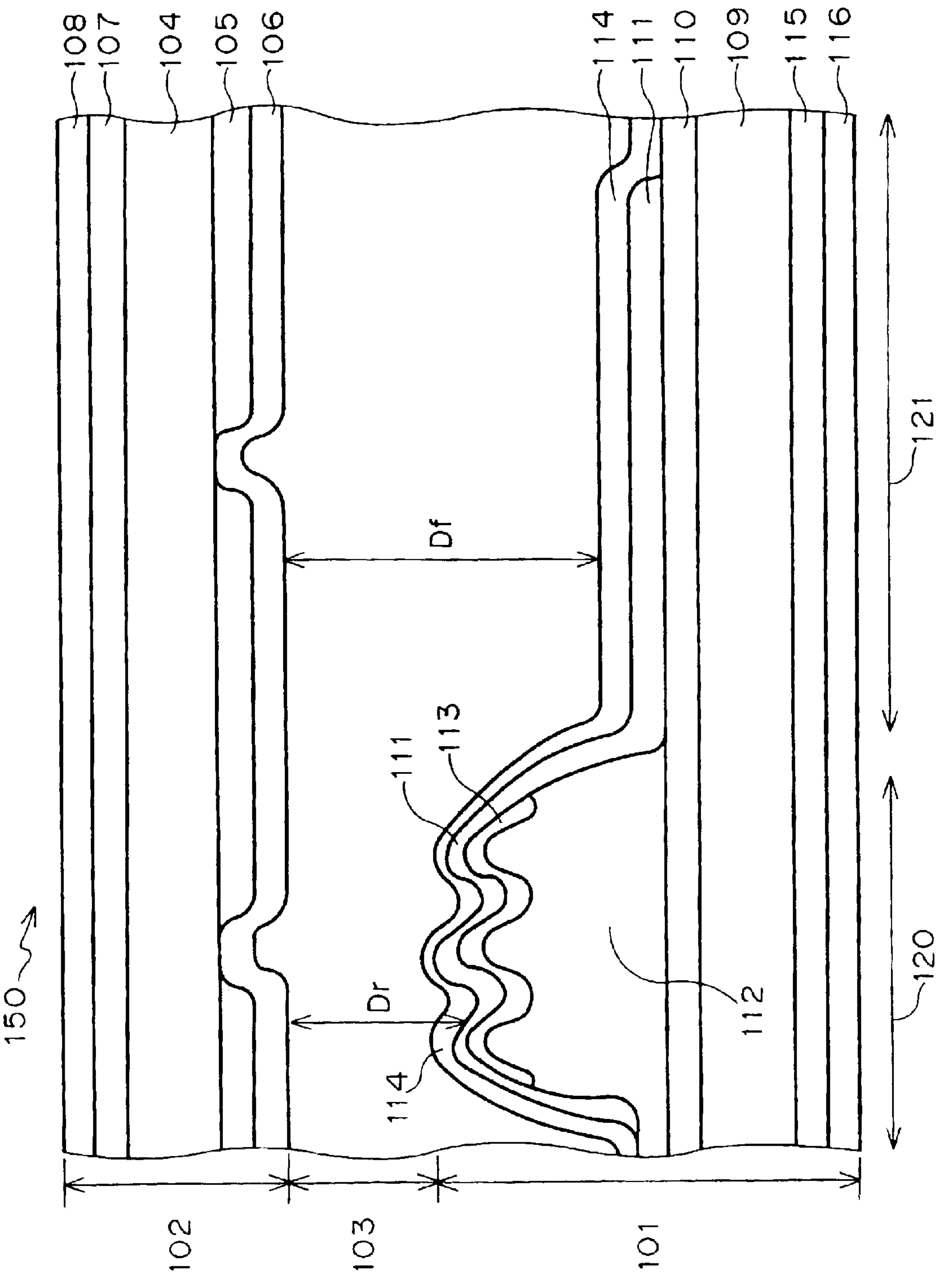
FIG. 2 is a cross-sectional view of a second example of a conventional half-transmission type liquid crystal display device.

As mentioned below, a half-transmission type liquid crystal display device in accordance with the embodiments of the present invention is different in structure from the conventional half-transmission type liquid crystal display device 150 illustrated in FIG. 2 in the pixel electrodes 111 and 113 of the first substrate 101 and the opposing electrode 105 of the second substrate 102, and has the same structure as that of the conventional half-transmission type liquid crystal display device 150 except the pixel electrodes 111 and 113 and the opposing electrode 105. Accordingly, unless explicitly indicated, only the pixel electrodes 113 and 111 of the first substrate 101 and the opposing electrode 105 of the second electrode 102 in each of the embodiments are illustrated in drawings.

Parts or elements that correspond to those of the conventional half-transmission type liquid crystal display device 150 illustrated in FIG. 2 have been provided with the same reference numerals, and operate in the same manner as corresponding parts or elements in the conventional half-transmission type liquid crystal display device 150, unless explicitly explained hereinbelow.

[First Embodiment]

Figure 3A:
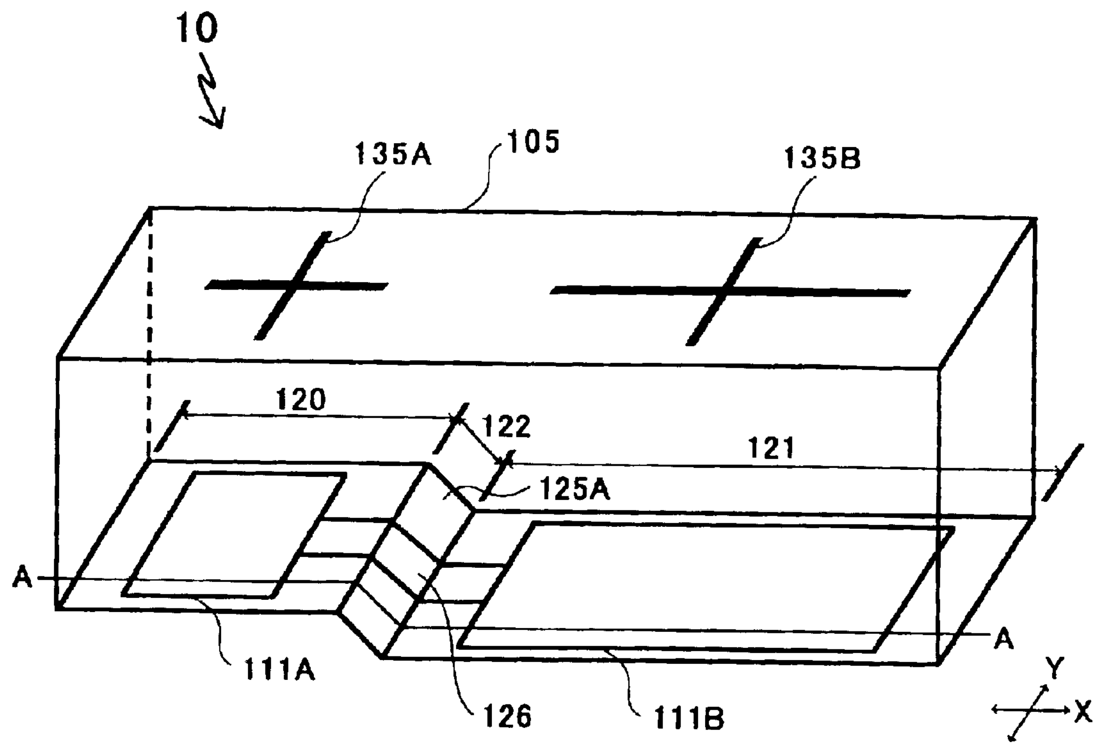
FIG. 3A is a partial perspective view of a half-transmission type liquid crystal display device in accordance with the first embodiment of the present invention.

FIG. 3A is a partial perspective view of a half-transmission type liquid crystal display device 10 in accordance with the first embodiment.

As illustrated in FIG. 3A, the half-transmission type liquid crystal display device 10 is designed to include an inclined surface or a level-different portion 122 between the first area 120 and the second area 121. The first and second areas 120 and 121 are continuous to each other through the inclined surface 122.

The pixel electrode 111 of the first substrate 101 is designed to have a first opening area 125A in which the pixel electrode 111 does not exist. The first opening area 125A defines a first alignment-controller.

The first opening area 125A extends across the inclined surface 122 and over the first and second areas 120 and 121. A pixel electrode 111A in the first area 120 and a pixel electrode 111B in the second area 122 are connected to each other through a line 126 extending in a longitudinal direction X of the half-transmission type liquid crystal display device 10. The line 126 connects the pixel electrode 111A at a center in a width-wise direction Y thereof and the pixel electrode 111B at a center in a width-wise direction Y thereof to each other.

A distance between the pixel electrodes 111A and 111B, that is, a length of the line 126 is in the range of about 8 to about 16 μm both inclusive.

The opposing electrode 105 of the second substrate 102 is formed with second opening areas 135A and 135B in facing relation to the pixel electrodes 111A and 111B, respectively. Each of the second opening areas defines a second alignment-controller.

Each of the second opening areas 135A and 135B is in the form of a cross-shaped slit. A center of the second opening area 135A is vertically in alignment with a center of the pixel electrode 111A, and a center of the second opening area 135B is vertically in alignment with a center of the pixel electrode 111B.

Figure 3B:
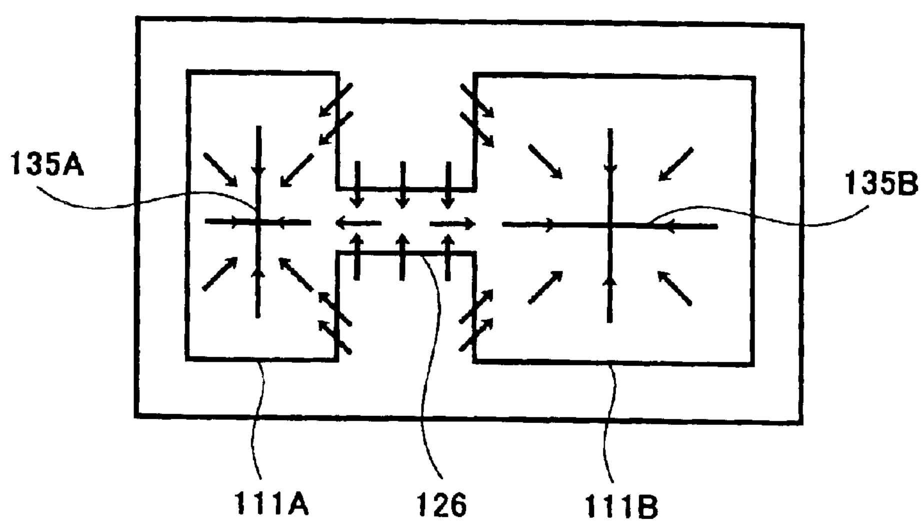
FIG. 3B illustrates how liquid crystal in a liquid crystal layer is inclined when electric field is applied thereto in the liquid crystal display device illustrated in FIG. 3A.

FIG. 3B illustrates how liquid crystal in the liquid crystal layer 103 is inclined when electric field is applied thereto.

As illustrated in FIG. 3B, when electric field is applied to liquid crystal in the liquid crystal layer 103, liquid crystal is inclined towards an area of the opposing electrode 105 located in alignment with the line 126 above the first opening area 125A in the inclined surface 122, whereas liquid crystal is inclined towards a center of an area of the opposing electrode 105 located in alignment with the center of the pixel electrode 111A above the first area 120 and a center of an area of the opposing electrode 105 located in alignment with the center of the pixel electrode 111B above the second area 121. Since liquid crystal molecules are uniformly oriented in the above-mentioned way, it is possible to reduce deterioration in visibility and reduction in a response speed.

The number of the line 126 is not to be limited to one. The pixel electrodes 111A and 111B may be connected to each other through two or more lines 126, in which case, it is preferable that the lines 126 are in parallel with one another.

[Second Embodiment]

Figure 4A:
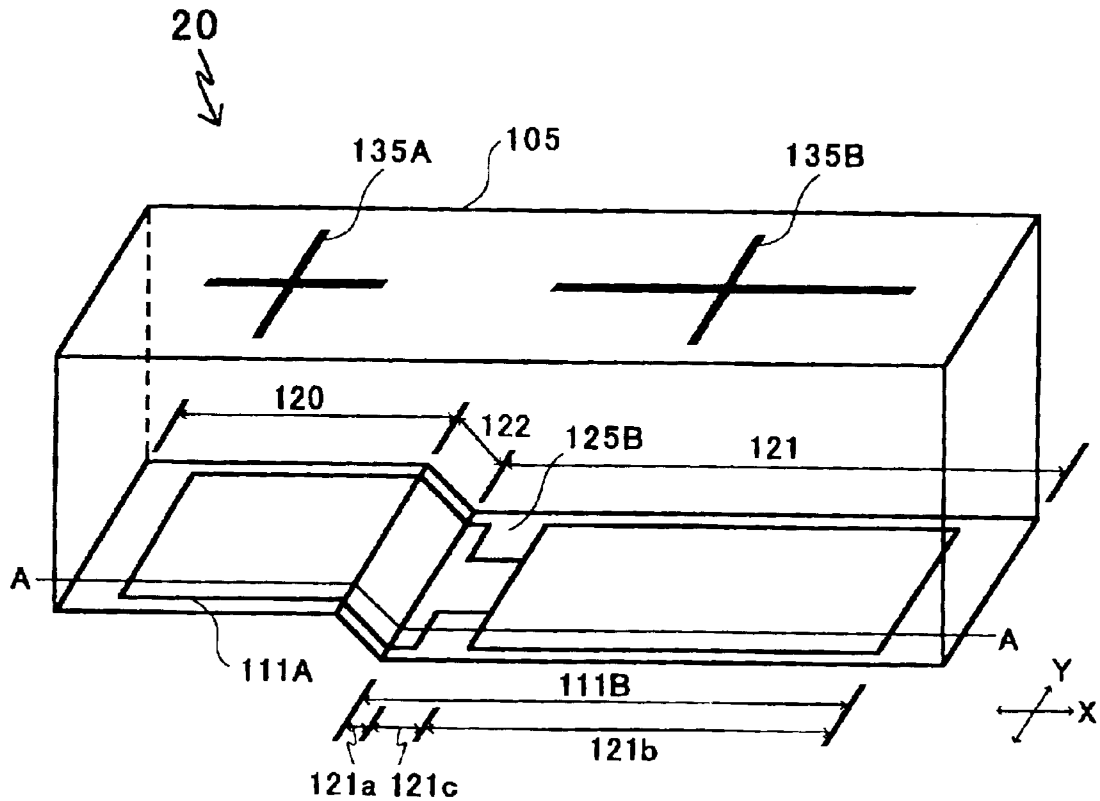
FIG. 4A is a partial perspective view of a half-transmission type liquid crystal display device in accordance with the second embodiment of the present invention.

FIG. 4A is a partial perspective view of a half-transmission type liquid crystal display device 20 in accordance with the second embodiment.

The liquid crystal display device 20 in accordance with the second embodiment is different in structure from the liquid crystal display device 10 in accordance with the first embodiment in a first opening area.

A first opening area 125B in the second embodiment is formed in the second area 121. As a result, the second area 121 is comprised of a rectangular first section 121*a* connecting to the pixel electrode 111A formed in the inclined surface 122 and the first area 120, a second section 121*b* spaced away from the first section 121*a*, and a line-shaped connection section 121*c* connecting the first and second sections 121*a* and 121*b* to each other.

The connection section 121*c* connects the first section 121*a* at a center in a width-wise direction Y thereof and the second section 121*b* at a center in a width-wise direction Y thereof to each other.

For instance, the first section 121*a* has a longitudinal length (a length in a direction X) in the range of 8 to 16 μm, and the first opening area 125B has a longitudinal length (a length in a direction X) in the range of 6 to 14 μm.

The opposing electrode 105 of the second substrate 102 is formed with second opening areas 135A and 135B in facing relation to the pixel electrodes 111A and 111B, respectively. Each of the second opening areas 135A and 135B defines a second alignment-controller.

Each of the second opening areas 135A and 135B is in the form of a cross-shaped slit. A center of the second opening area 135A is vertically in alignment with a center of the pixel electrode 111A, and a center of the second opening area 135B is vertically in alignment with a center of the second section 121*b* of the pixel electrode 111B.

Figure 4B:
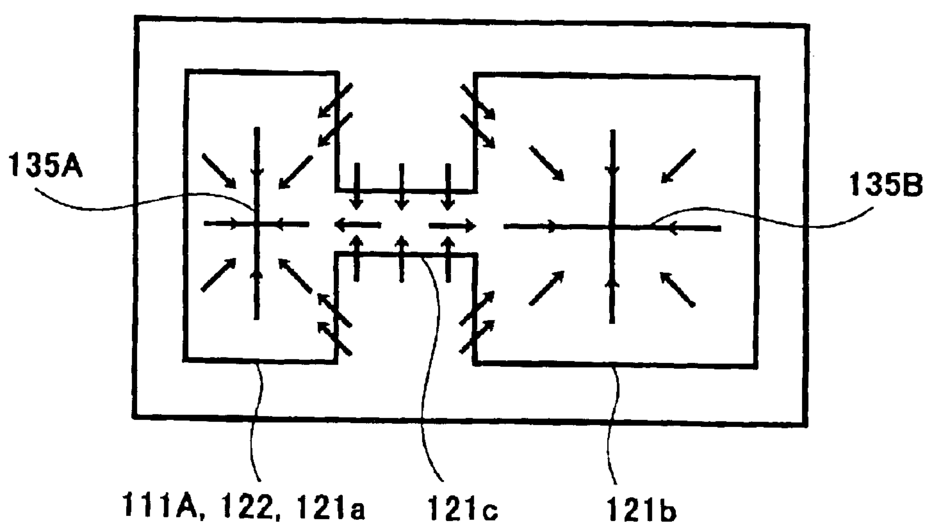
FIG. 4B illustrates how liquid crystal in a liquid crystal layer is inclined when electric field is applied thereto in the liquid crystal display device illustrated in FIG. 4A.

FIG. 4B illustrates how liquid crystal in the liquid crystal layer 103 is inclined when electric field is applied thereto.

As illustrated in FIG. 4B, when electric field is applied to liquid crystal in the liquid crystal layer 103, liquid crystal is inclined towards an area of the opposing electrode 105 located in alignment with a center of the first opening area 125B, whereas liquid crystal is inclined towards a center of an area of the opposing electrode 105 located in alignment with the center of the pixel electrode 111A above the first area 120 and a center of an area of the opposing electrode 105 located in alignment with the center of the second section 121*b* of the pixel electrode 111B above the second area 121. Since liquid crystal molecules are uniformly oriented in the above-mentioned way, it is possible to reduce deterioration in visibility and reduction in a response speed.

The number of the connection section 121*c* is not to be limited to one. The pixel electrodes 111A and 111B may be connected to each other through two or more connection lines 121*c*, in which case, it is preferable that the connection lines 121*c* are in parallel with one another.

Figure 5A:
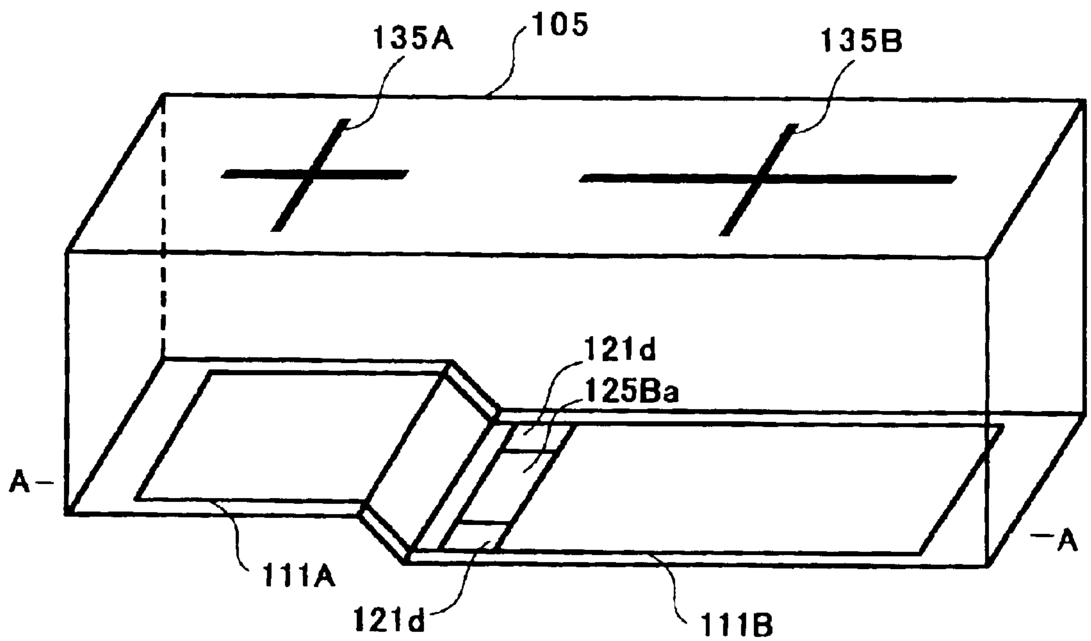
FIG. 5A is a partial perspective view of a half-transmission type liquid crystal display device in accordance with a first variant of the second embodiment of the present invention.

FIG. 5A is a partial perspective view of a first variant of the half-transmission type liquid crystal display device 20.

In the first variant, the first opening area 125Ba is formed in the pixel electrode 111B in the second area 121. Thus, the first section 121*a* and the second section 121*b* are connected to each other through two connection sections 121*d* formed at opposite ends of the first and second sections 121*a* and 121*b* in a width-wise direction thereof. The first variant illustrated in FIG. 5A has the same structure as that of the half-transmission type liquid crystal display device 20.

Figure 5B:
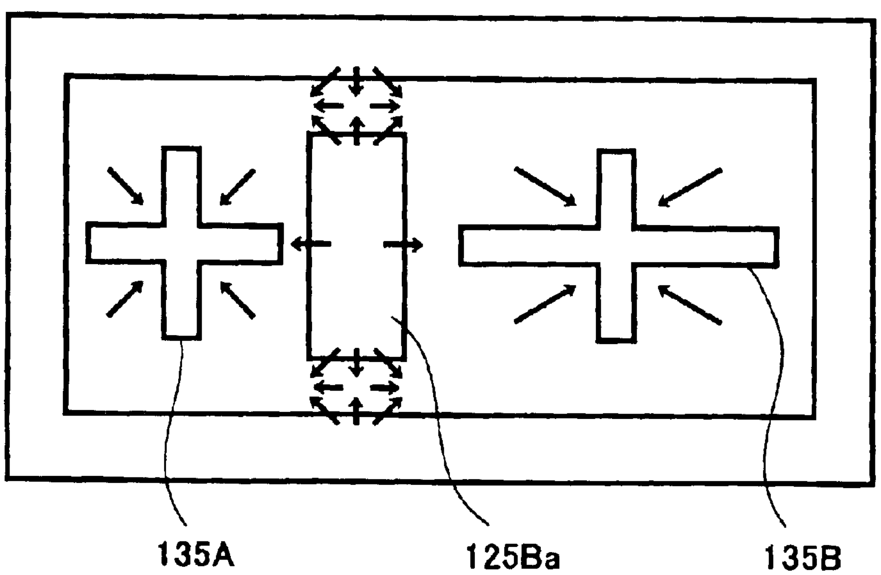
FIG. 5B illustrates how liquid crystal in a liquid crystal layer is inclined when electric field is applied thereto in the liquid crystal display device illustrated in FIG. 5A.

FIG. 5B illustrates how liquid crystal in the liquid crystal layer 103 is inclined when electric field is applied thereto in the first variant illustrated in FIG. 5A.

As illustrated in FIG. 5B, since liquid crystal molecules are uniformly oriented in the first variant, it is possible to reduce deterioration in visibility and reduction in a response speed.

Figure 6A:
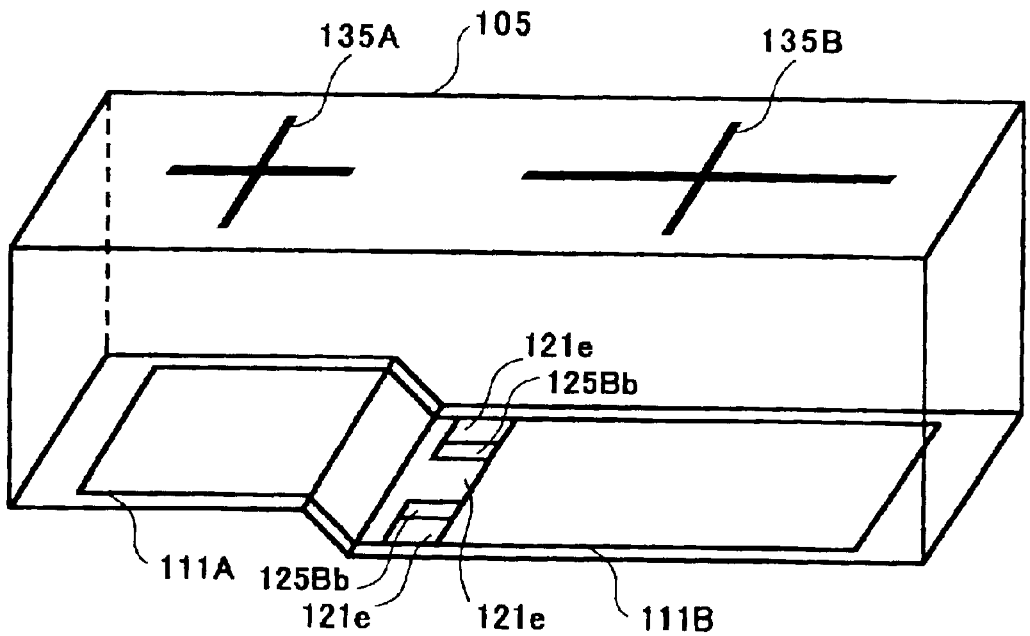
FIG. 6A is a partial perspective view of a half-transmission type liquid crystal display device in accordance with a second variant of the second embodiment of the present invention.

FIG. 6A is a partial perspective view of a second variant of the half-transmission type liquid crystal display device 20.

In the second variant, the first opening area 125Bb is formed in the pixel electrode 111B in the second area 121 in separated two areas. Hence, the first section 121*a* and the second section 121*b* are connected to each other through three connection sections 121*e* formed at opposite ends and center of the first and second sections 121*a* and 121*b* in a width-wise direction thereof. The second variant illustrated in FIG. 6A has the same structure as that of the half-transmission type liquid crystal display device 20.

Figure 6B:
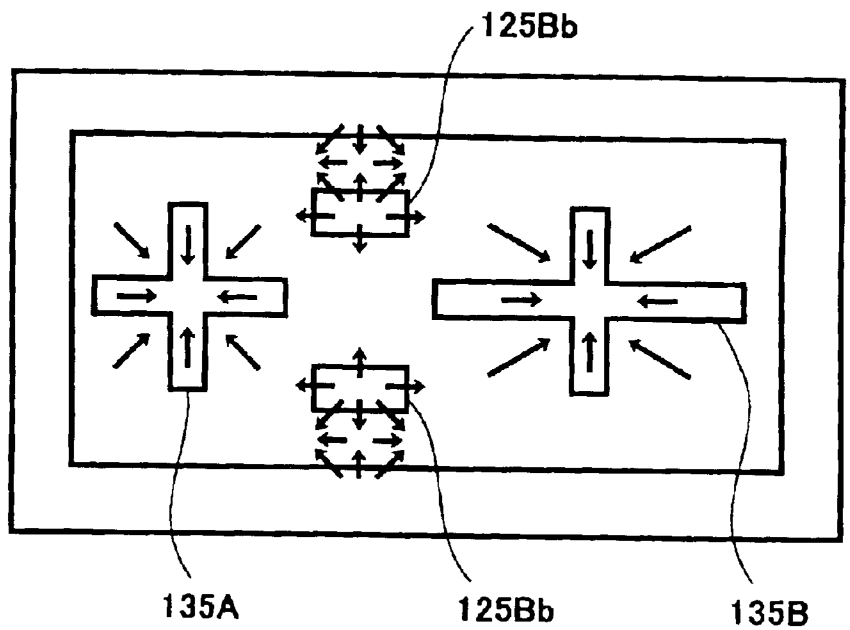
FIG. 6B illustrates how liquid crystal in a liquid crystal layer is inclined when electric field is applied thereto in the liquid crystal display device illustrated in FIG. 6A.

FIG. 6B illustrates how liquid crystal in the liquid crystal layer 103 is inclined when electric field is applied thereto in the first variant illustrated in FIG. 6A.

As illustrated in FIG. 6B, since liquid crystal molecules are uniformly oriented in the second variant, it is possible to reduce deterioration in visibility and reduction in a response speed.

[Third Embodiment]

Figure 7:
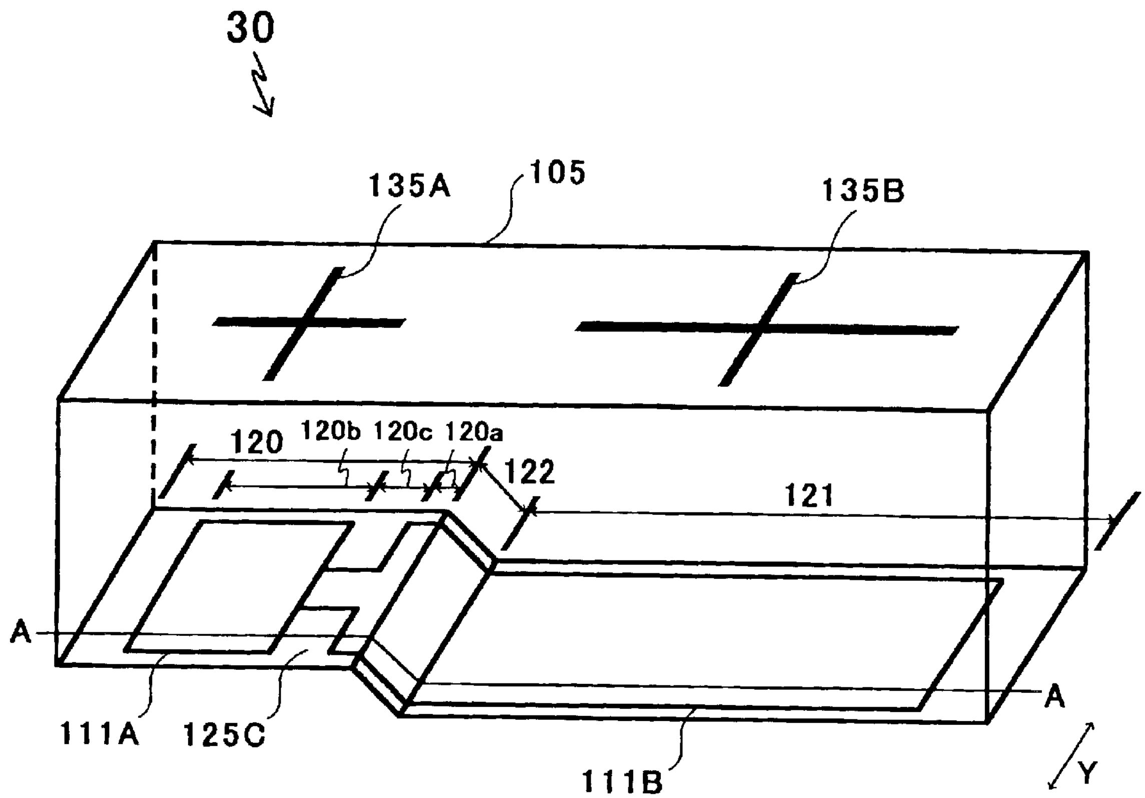
FIG. 7 is a partial perspective view of a half-transmission type liquid crystal display device in accordance with the third embodiment of the present invention.

FIG. 7 is a partial perspective view of a half-transmission type liquid crystal display device 30 in accordance with the third embodiment.

The liquid crystal display device 30 in accordance with the third embodiment is different in structure from the liquid crystal display device 10 in accordance with the first embodiment in a first opening area.

A first opening area 125C in the third embodiment is formed in the first area 120. As a result, the first area 120 is comprised of a rectangular first section 120*a* connecting to the pixel electrode 111B formed in the inclined surface 122 and the second area 121, a second section 120*b* spaced away from the first section 120*a*, and a line-shaped connection section 120*c* connecting the first and second sections 120*a* and 120*b* to each other.

The connection section 120*c* connects the first section 120*a* at a center in a width-wise direction Y thereof and the second section 120*b* at a center in a width-wise direction Y thereof to each other.

For instance, the first section 120*a* has a longitudinal length (a length in a direction X) in the range of 8 to 16 $\mu$m, and the first opening area 125C has a longitudinal length (a length in a direction X) in the range of 6 to 14 $\mu$m.

The opposing electrode 105 of the second substrate 102 is formed with second opening areas 135A and 135B in facing relation to the second section 120*b* and the pixel electrode 111B in the second area 121, respectively. Each of the second opening areas 135A and 135B defines a second alignment-controller.

Each of the second opening areas 135A and 135B is in the form of a cross-shaped slit. A center of the second opening area 135A is vertically in alignment with a center of the second section 120*b*, and a center of the second opening area 135B is vertically in alignment with a center of the pixel electrode 111B.

Similarly to the second embodiment, as having been explained with reference to FIG. 4B, when electric field is applied to liquid crystal in the liquid crystal layer 103, liquid crystal is inclined towards an area of the opposing electrode 105 located in alignment with a center of the first opening area 125C, whereas liquid crystal is inclined towards a center of an area of the opposing electrode 105 located in alignment with the center of the second section 120*b* above the first area 120 and a center of an area of the opposing electrode 105 located in alignment with the center of the pixel electrode 111B above the second area 121. Since liquid crystal molecules are uniformly oriented in the above-mentioned way, it is possible to reduce deterioration in visibility and reduction in a response speed.

The number of the connection section 120*c* is not to be limited to one. The pixel electrodes 111A and 111B may be connected to each other through two or more connection lines 120*c,* in which case, it is preferable that the connection lines 120*c* are in parallel with one another.

The above-mentioned first and second variants of the second embodiments may be applied to the third embodiment.

Figure 8:
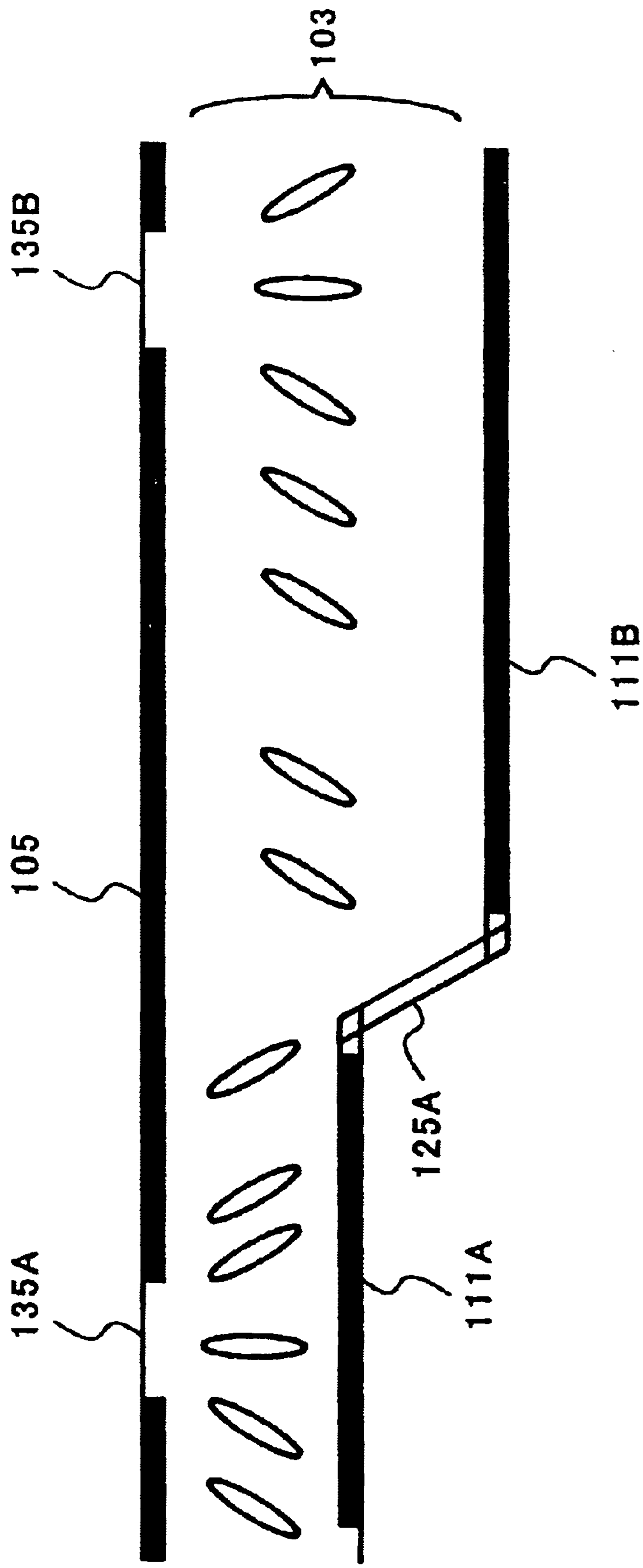
FIG. 8 is a cross-sectional view taken along the line A—A in FIG. 3A.
Figure 9:
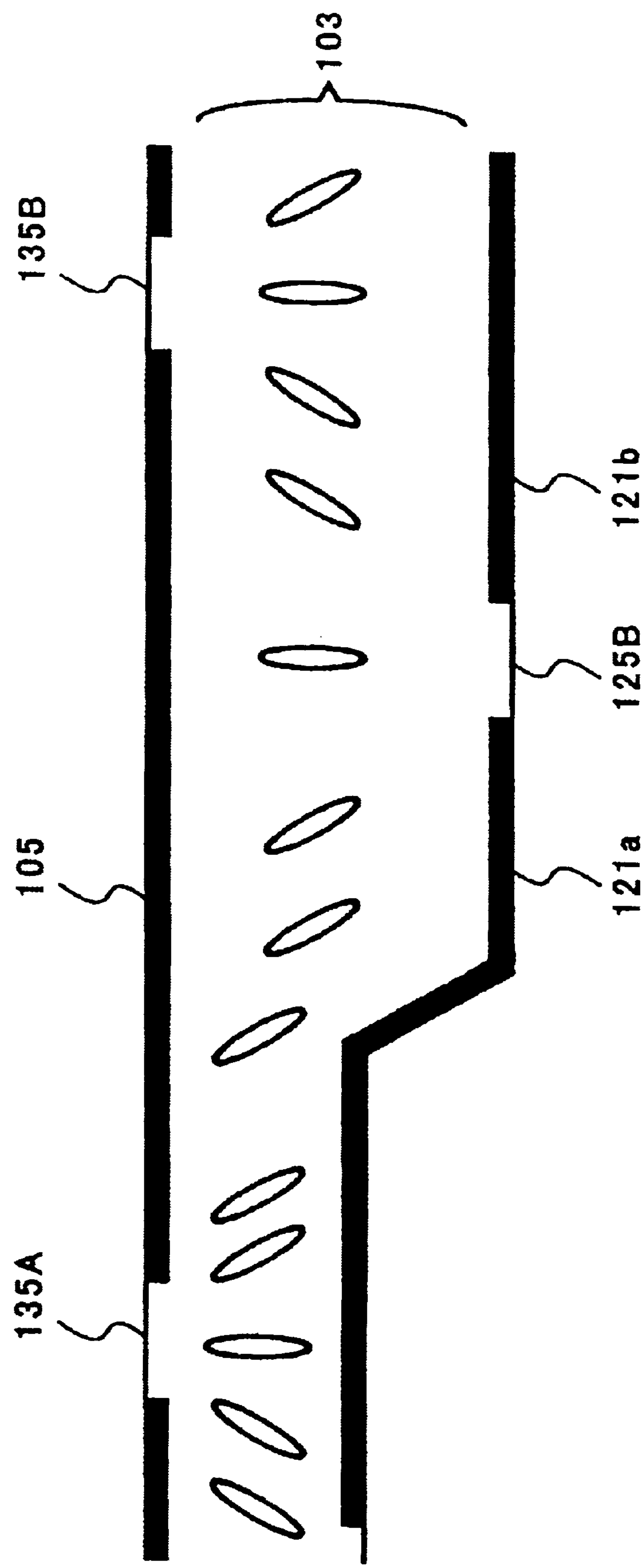
FIG. 9 is a cross-sectional view taken along the line A—A in FIG. 4A.
Figure 10:
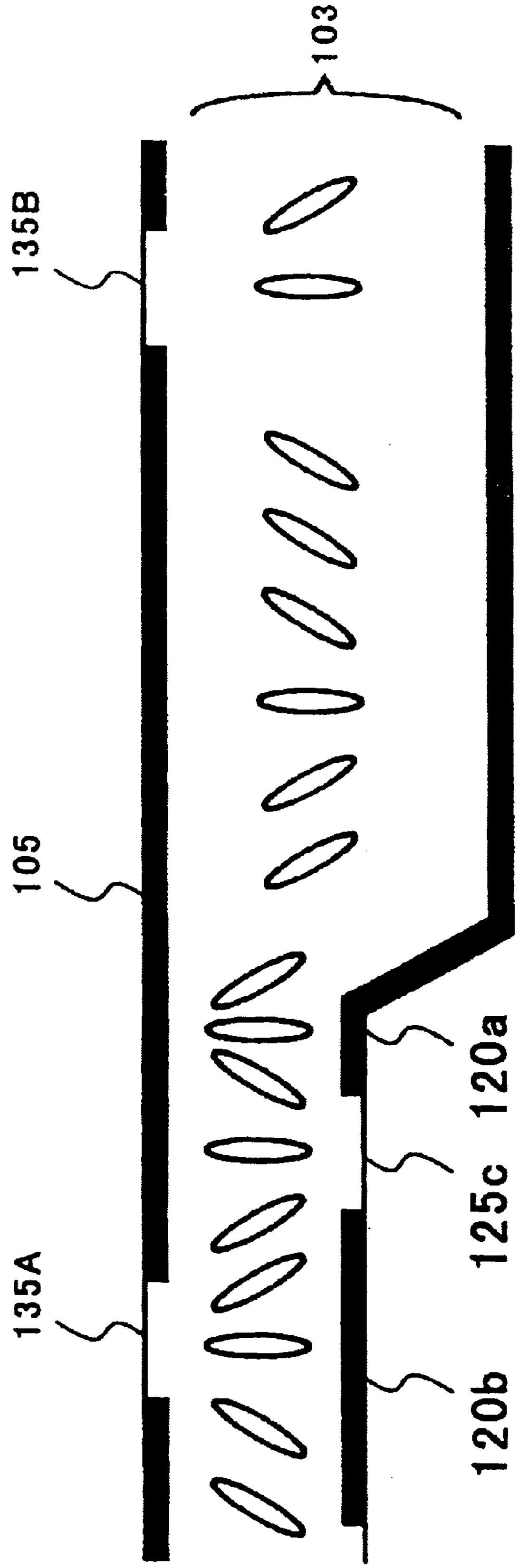
FIG. 10 is a cross-sectional view taken along the line A—A in FIG. 7.

The inventors conducted the experiments to know behavior of liquid crystal when electric field is applied thereto in the liquid crystal display devices in accordance with the first to third embodiments. The results are shown in FIGS. 8 to 10. FIG. 8 is a cross-sectional view taken along the line A—A in FIG. 3A, FIG. 9 is a cross-sectional view taken along the line A—A in FIG. 4A, and FIG. 10 is a cross-sectional view taken along the line A—A in FIG. 7. FIGS. 8, 9 and 10 correspond to the first, second and third embodiments, respectively.

When electric field is applied to liquid crystal in the liquid crystal layer 103, liquid crystal behaves more stably in the second embodiment than in the first and third embodiments, and behaves more stably in the first embodiment than in the third embodiment.

In the second embodiment, as illustrated in FIG. 9, liquid crystal is inclined by means of the first opening area 125B formed in the pixel electrode 111B such that its end facing the opposing electrode 105 is directed to the inclined surface 122 in an area closer to the inclined surface 122 than the first opening area 125B. Since liquid crystal is inclined at the same angle as an angle by which the pixel electrode 111B in the inclined surface 122 is inclined, natural continuity is ensured in a direction of alignment of liquid crystal.

In the first embodiment, as illustrated in FIG. 8, liquid crystal is vertically aligned above the first opening area 125A by virtue of the first opening area 125A. Liquid crystal in the first area 120 is inclined such that its end facing the opposing electrode 105 is directed to the second opening area 135A, and liquid crystal in the second area 121 is inclined such that its end facing the opposing electrode 105 is directed to the second opening area 135B. Thus, liquid crystal is inclined in opposite directions at opposite sides about the inclined surface 122, ensuring continuous alignment profile.

In the third embodiment, as illustrated in FIG. 10, liquid crystal existing between the first opening area 125C and the inclined surface 122 is inclined such that its end facing the opposing electrode 105 is directed towards the inclined surface 122, and liquid crystal existing beyond the first opening area 125C with respect to the inclined surface 122 is inclined such that its end facing the opposing electrode 105 is directed away from the inclined surface 122.

However, since liquid crystal existing above the inclined surface 122 is inclined at the same angle as an angle by which the inclined surface 122 is inclined, liquid crystal is inclined such that its end facing the opposing electrode 105 is directed to the first area 120 only in an area between the first opening area 125C and the inclined surface 122. As a result, continuity in alignment direction of liquid crystal molecules is deteriorated.

[Fourth Embodiment]

Figure 11:
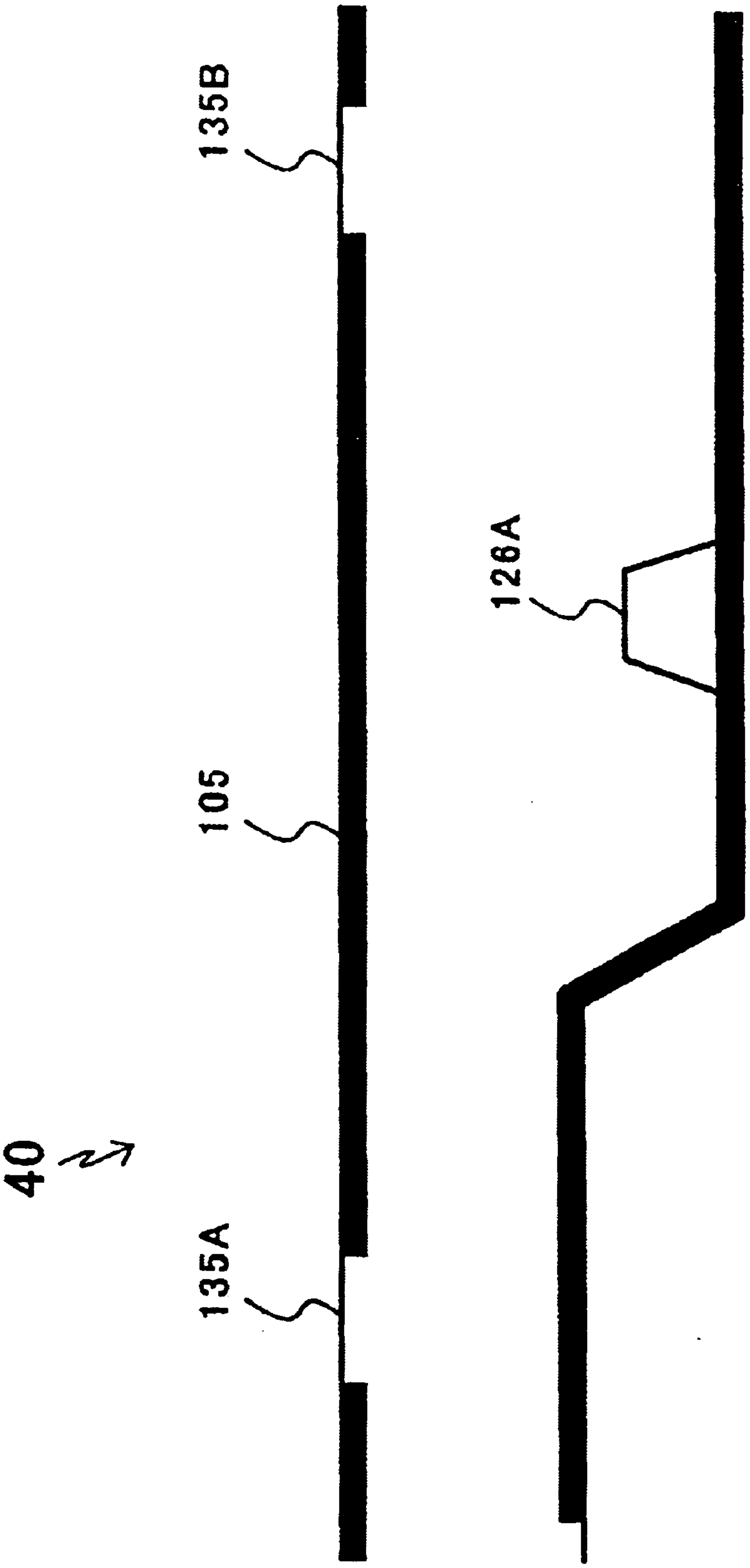
FIG. 11 is a cross-sectional view of a half-transmission type liquid crystal display device in accordance with the fourth embodiment of the present invention.

FIG. 11 is a cross-sectional view of a half-transmission type liquid crystal display device 40 in accordance with the fourth embodiment of the present invention.

In comparison with the half-transmission type liquid crystal display device 20 in accordance with the second embodiment, the liquid crystal display device 40 is designed to include a projection 126A composed of dielectric substance, in place of the first opening area 125B. The projection 126A is formed at an area where the first opening area 125B used to be. The liquid crystal display device 40 is identical in structure with the liquid crystal display device 20 except for the above-mentioned replacement.

The first opening area 125B is identical with the projection 126A in that the pixel electrode 111B is not formed there. However, the first opening area 125B forms a recess in comparison with an area where the pixel electrode 111B is formed, whereas the projection 126A projects beyond an area where the pixel electrode 111B is formed.

For instance, the projection 126A has a height in the range of 0.5 to 1 $\mu$m.

Similarly to the half-transmission type liquid crystal display device 20 in accordance with the second embodiment, illustrated in FIG. 9, liquid crystal molecules can be uniformly oriented also by the formation of the projection 126A in place of the first opening area 125B, it is possible to reduce deterioration in visibility and reduction in a response speed.

[Fifth Embodiment]

Figure 12:
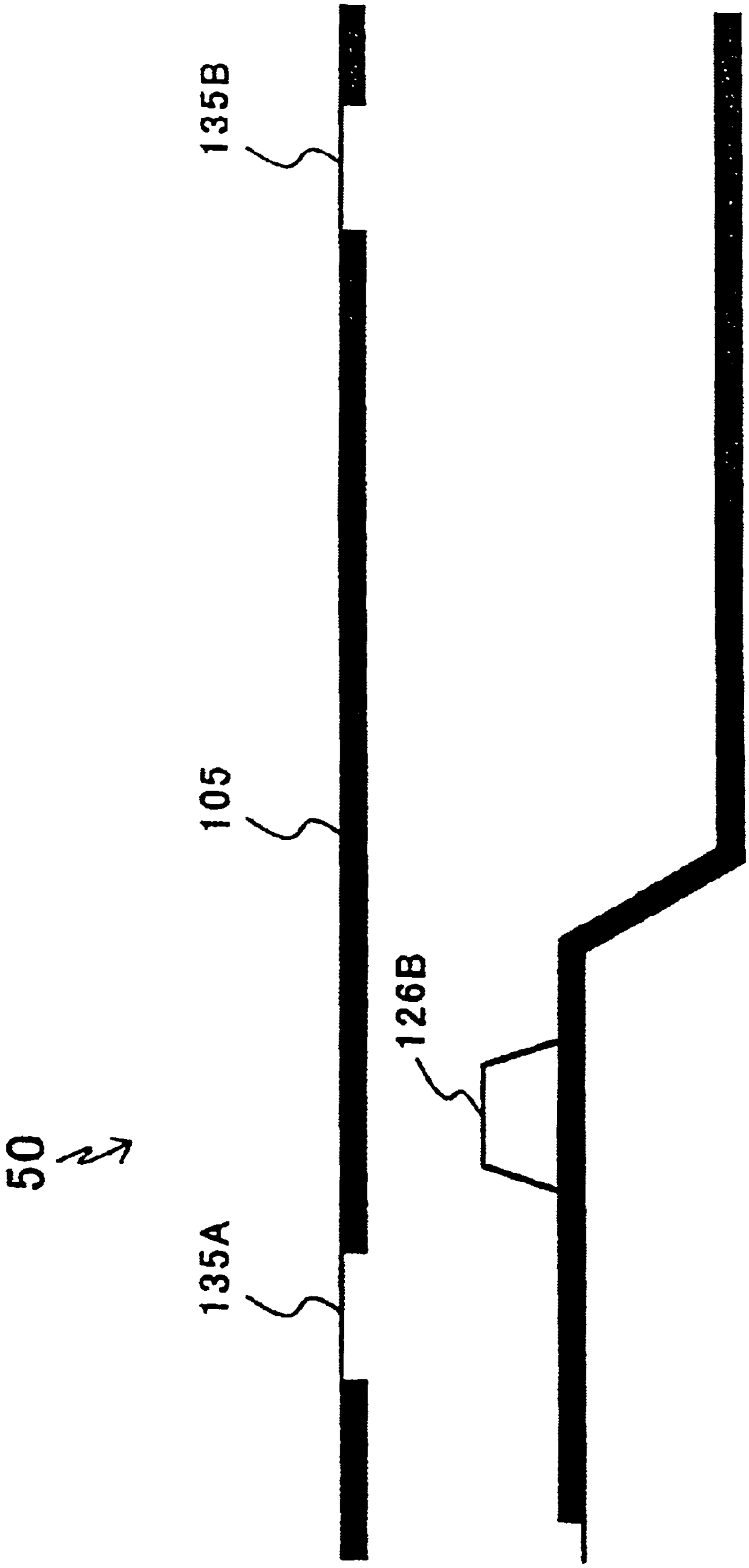
FIG. 12 is a cross-sectional view of a half-transmission type liquid crystal display device in accordance with the fifth embodiment of the present invention.

FIG. 12 is a cross-sectional view of a half-transmission type liquid crystal display device 50 in accordance with the fifth embodiment.

In comparison with the half-transmission type liquid crystal display device 30 in accordance with the third embodiment, the liquid crystal display device 50 is designed to include a projection 126B composed of dielectric substance, in place of the first opening area 125C. The projection 126B is formed at an area where the first opening area 125C used to be. The liquid crystal display device 50 is identical in structure with the liquid crystal display device 30 except for the above-mentioned replacement.

The first opening area 125C is identical with the projection 126B in that the pixel electrode 111A is not formed there. However, the first opening area 125C forms a recess in comparison with an area where the pixel electrode 111 is formed, whereas the projection 126B projects beyond an area where the pixel electrode 111 is formed.

For instance, the projection 126B has a height in the range of 0.5 to 1 $\mu$m.

Similarly to the half-transmission type liquid crystal display device 30 in accordance with the third embodiment, illustrated in FIG. 10, liquid crystal molecules can be uniformly oriented also by the formation of the projection 126B in place of the first opening area 125C, it is possible to reduce deterioration in visibility and reduction in a response speed.

[Sixth Embodiment]

Figure 13:
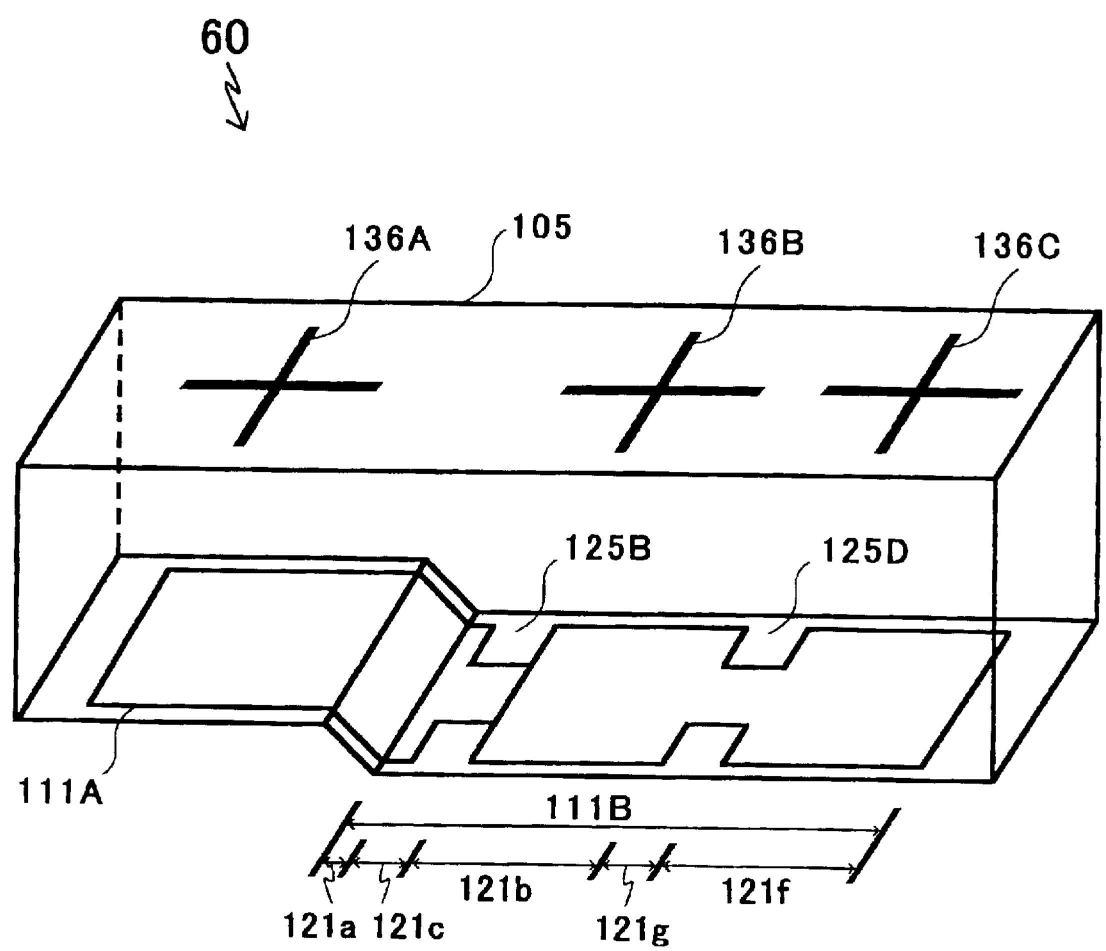
FIG. 13 is a partial perspective view of a half-transmission type liquid crystal display device in accordance with the sixth embodiment of the present invention.

FIG. 13 is a partial perspective view of a half-transmission type liquid crystal display device 60 in accordance with the sixth embodiment of the present invention.

The half-transmission type liquid crystal display device 60 in accordance with the sixth embodiment is different in structure from the half-transmission type liquid crystal display device 20 in accordance with the second embodiment in a shape of a first opening area.

The first opening area in the sixth embodiment is comprised of a first opening area 125B illustrated in FIG. 4A and a first opening area 125D. The first opening areas 125B and 125D are spaced away from each other, and are designed to have the same size as each other.

Thus, the second area 121 is comprised of a rectangular first section 121*a* connecting to the pixel electrode 111A formed in the inclined surface 122 and the first area 120, a second section 121*b* spaced away from the first section 121*a*, a line-shaped connection section 121*c* connecting the first and second sections 121*a* and 121*b* to each other, a third section 121*f* spaced away from the second section 121*b*, and a line-shaped connection section 121*g* connecting the second and third sections 121*b* and 121*f* to each other.

The second section 121*b* and the third section 121*f* have substantially the same size as each other.

The connection section 121*c* connects the first section 121*a* at a center in a width-wise direction Y thereof and the second section 121*b* at a center in a width-wise direction Y thereof to each other. Similarly, the connection section 121*g* connects the second section 121*b* at a center in a width-wise direction Y thereof and the third section 121*f* at a center in a width-wise direction Y thereof to each other.

The opposing electrode 105 of the second substrate 102 is formed with second opening areas 136A, 136B and 136C in facing relation to the pixel electrode 111A, the second section 121*b* and the third section 121*f*, respectively. Each of the second opening areas 136A, 136B and 136C defines a second alignment-controller.

Each of the second opening areas 136A, 136B and 136C is in the form of a cross-shaped slit. A center of the second opening area 136A is vertically in alignment with a center of the pixel electrode 111A, a center of the second opening area 136B is vertically in alignment with a center of the second section 121*b*, and a center of the second opening area 136C is vertically in alignment with a center of the third section 121*f*.

In accordance with the liquid crystal display device 60, the pixel electrode 111B in the second area 121 is divided into a plurality of sections having the same size as one another, ensuring enhancement in a response speed of liquid crystal when electric field is applied to the liquid crystal layer 103.

Specifically, on application of electric field to the liquid crystal layer 103, a part of liquid crystal molecules having been vertically aligned is inclined due to the first opening areas 125B and 125D. Subsequently, surrounding liquid crystal molecules are inclined in the same direction. As a result, alignment of liquid crystal molecules is sequentially varied in response to a voltage applied to the liquid crystal layer. Hence, the smaller an area of sections into which the pixel electrode 111B is divided is, the higher a response speed of liquid crystal molecules is when electric field is applied to the liquid crystal layer.

In the sixth embodiment, the pixel electrode 111B in the second area 121 is divided into two sections (the second and third sections 121*b* and 121*f*). However, the number of the sections into which the pixel electrode 111B in the second area 121 is divided is not to be limited to two. Three or more may be selected.

Figure 14:
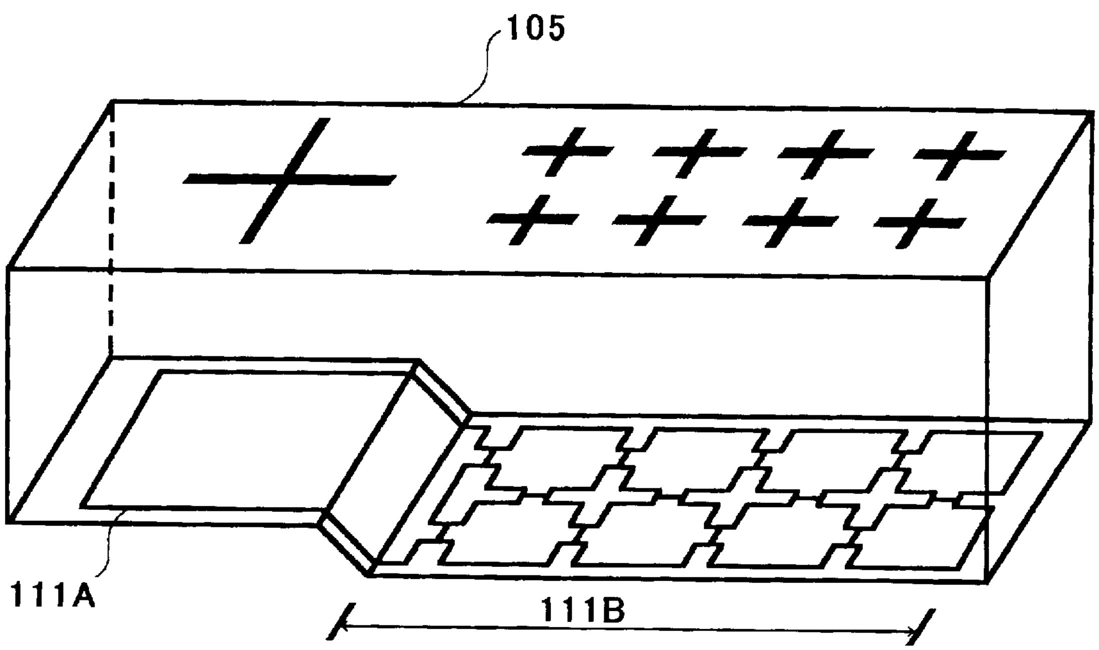
FIG. 14 is a partial perspective view of a half-transmission type liquid crystal display device in accordance with a variant of the sixth embodiment of the present invention.

FIG. 14 illustrates an example in which the pixel electrode 111B in the second area 121 is divided into eight sections having substantially the same size as one another.

The sections into which the pixel electrode 111B in the second area 121 is divided may be arranged in a line, as illustrated in FIG. 13, or may be arranged in a matrix, as illustrated in FIG. 14.

In a liquid crystal display device including the first and second areas and having cell gaps different between the first and second areas, a response speed of liquid crystal in an area where a cell gap is higher is smaller than a response speed of liquid crystal in an area where a cell gap is smaller. Hence, by designing each of the sections to have an area smaller than an area of the pixel electrode 111A in the first area 120, it would be possible to reduce or cancel a difference in a response speed of liquid crystal which difference is caused by a difference in cell gaps.

In the sixth embodiment, the pixel electrode 111B in the second area 121 is divided into a plurality of the sections by the first opening areas. However, it should be noted that it is not always necessary to divide the pixel electrode 111B and/or 111A. The pixel electrode 111B or 111A may be designed to have an appropriate area.

The projection 126A or 126B shown in the fourth and fifth embodiments may be formed in place of the first opening areas 125B and 125D in an area where the first opening areas 125B and 125D are formed.

[Seventh Embodiment]

FIGS. 15A to 15K are plan views each illustrating the pixel electrode 111A or 111B and an associated second opening area formed in the opposing electrode 105.

Figure 15A:
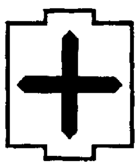
FIGS. 15A to 15K are plan views each illustrating a pixel electrode and an associated second opening area formed at an opposing electrode.
Figure 15B:
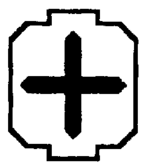
Figure 15C:
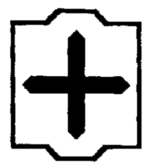
Figure 15D:
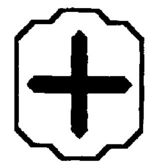
Figure 15E:
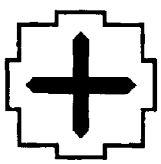
Figure 15F:
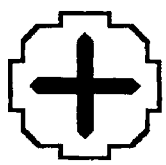
Figure 15G:
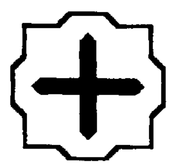
Figure 15H:
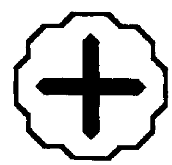
Figure 15I:
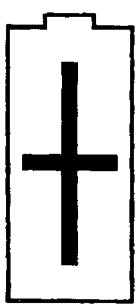
Figure 15J:
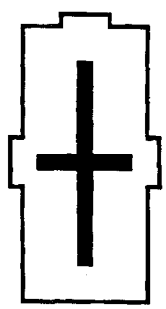
Figure 15K:
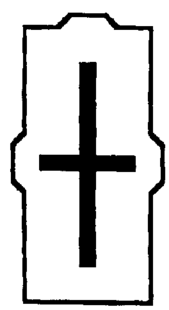

For instance, the pixel electrodes 111A and 111B may be square, as illustrated in FIGS. 15A, 15C, 15E and 15G, or rectangular, as illustrated in FIGS. 15I, 15J and 15K.

As illustrated in FIGS. 15B, 15D, 15F and 15H, the pixel electrodes 111A and 111B may be chamfered at four corners.

The pixel electrodes 111A and 111B may have rectangular or trapezoidal projections on any one or more of four sides.

The second opening area formed in the opposing electrode 105 may be a cross in shape, as illustrated in FIGS. 15A to 15H, or may be a vertically elongate cross, as illustrated in FIGS. 15I to 15K.

By forming the cross-shaped second opening area in the opposing electrode 105 in facing relation to the square or rectangular pixel electrodes 111A and 111B, a liquid crystal display device could have a broad viewing angle.

FIGS. 16A to 16G are plan views each illustrating the pixel electrodes 111A and 111B which are formed square, and an associated second opening area formed in the opposing electrode 105.

Figure 16A:
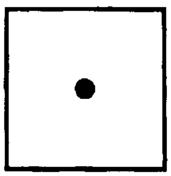
FIGS. 16A to 16G are plan views each illustrating a square pixel electrode and an associated second opening area formed at an opposing electrode.
Figure 16B:
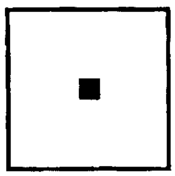
Figure 16C:
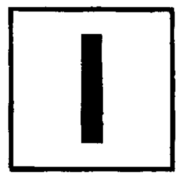
Figure 16D:
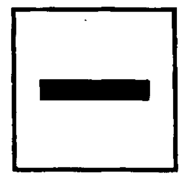
Figure 16E:
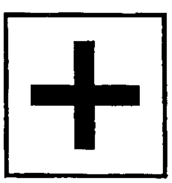
Figure 16F:
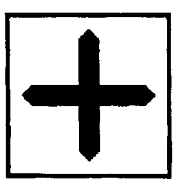
Figure 16G:
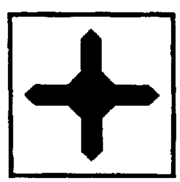

The second opening area may be a circle (FIG. 16A), a square (FIG. 16B), a vertical line (FIG. 16C), a horizontal line (FIG. 16D), a cross (FIGS. 16E and 16F), or a combination of a cross and a square (FIG. 16G).

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-224997 filed on Aug. 1, 2002 including specification, claims, drawings and summary is incorporated herein by reference in its entirety.

What is claimed is:

1. A liquid crystal display device comprising:

(a) a first substrate including a first area in which an incident light is reflected and a second area through which a light passes, and further including a pixel electrode covering said first and second areas therewith;

(b) a second substrate including at least an opposing electrode;

(c) a liquid crystal layer sandwiched between said first and second substrates and including liquid crystal molecules each having a major axis aligned perpendicularly to said first and second substrates when no electric field is applied thereto; and (d) a first alignment-controller for controlling alignment of said liquid crystal molecules, said first alignment-controller being arranged only at a boundary of said first and second areas or only in the vicinity of said boundary.

2. The liquid crystal display device as set forth in claim 1, further comprising a second alignment-controller for controlling alignment of said liquid crystal molecules, said second alignment-controller being formed in said second substrate in facing relation to said first and second areas.

3. A liquid crystal display device comprising:

(a) a first substrate including a first area in which an incident light is reflected and a second area through which a light passes, and further including a pixel electrode covering said first and second areas therewith;

(b) a second substrate including at least an opposing electrode;

(c) a liquid crystal layer sandwiched between said first and second substrates and including liquid crystal molecules each having a major axis aligned perpendicularly to said first and second substrates when no electric field is applied thereto; and (d) a first alignment-controller for controlling alignment of said liquid crystal molecules, said first alignment-controller being arranged at a boundary of said first and second areas or in the vicinity of said boundary, wherein said first alignment-controller is comprised of an opening area of said first substrate where said pixel electrode does not exist.

4. A liquid crystal display device comprising:

(a) a first substrate including a first area in which an incident light is reflected and a second area through which a light passes, and further including a pixel electrode covering said first and second areas therewith;

(b) a second substrate including at least an opposing electrode;

(c) a liquid crystal layer sandwiched between said first and second substrates and including liquid crystal molecules each having a major axis aligned perpendicularly to said first and second substrates when no electric field is applied thereto; and (d) a first alignment-controller for controlling alignment of said liquid crystal molecules, said first alignment-controller being arranged at a boundary of said first and second areas or in the vicinity of said boundary, wherein said first alignment-controller is comprised of a projection formed on said pixel electrode on said first substrate, said projection being composed of dielectric substance.

5. The liquid crystal display device as set forth in claim 1, wherein a cell gap above said first area and a cell gap above said second area are different from each other.

6. The liquid crystal display device as set forth in claim 1, wherein said first substrate has a level-different portion between said first and second areas.

7. The liquid crystal display device as set forth in claim 3, wherein said opening area is located in said first area.

8. The liquid crystal display device as set forth in claim 3, wherein said opening area is located at a boundary between said first and second areas.

9. The liquid crystal display device as set forth in claim 3, wherein said opening area is located in said second area.

10. The liquid crystal display device as set forth in claim 4, wherein said projection is located in said first area.

11. The liquid crystal display device as set forth in claim 4, wherein said projection is located in said second area.

12. The liquid crystal display device as set forth in claim 2, wherein said second alignment-controller is comprised of a second opening area of said second substrate where said opposing electrode does not exist.

13. A liquid crystal display device comprising:

(a) a first substrate including a first area in which an incident light is reflected and a second area through which a light passes, and further including a pixel electrode covering said first and second areas therewith;

(b) a second substrate including at least an opposing electrode;

(c) a liquid crystal layer sandwiched between said first and second substrates and including liquid crystal molecules each having a major axis aligned perpendicularly to said first and second substrates when no electric field is applied thereto; and (d) a first alignment-controller for controlling alignment of said liquid crystal molecules, said first alignment-controller being arranged at a boundary of said first and second areas or in the vicinity of said boundary, wherein said pixel electrode is formed with at least one opening area for dividing said pixel electrode into a plurality of sections in said first and second areas, said second alignment-controller is comprised of a second opening area of said second substrate where said opposing electrode does not exist, said opposing electrode is formed with two second opening areas each in facing relation to said pixel electrode in said first area and said pixel electrode in said second area.

14. A liquid crystal display device comprising:

(a) a first substrate including a first area in which an incident light is reflected and a second area through which a light passes, and further including a pixel electrode covering said first and second areas therewith;

(b) a second substrate including at least an opposing electrode;

(c) a liquid crystal layer sandwiched between said first and second substrates and including liquid crystal molecules each having a major axis aligned perpendicularly to said first and second substrates when no electric field is applied thereto; and (d) a first alignment-controller for controlling alignment of said liquid crystal molecules, said first alignment-controller being arranged at a boundary of said first and second areas or in the vicinity of said boundary, wherein said pixel electrode is formed with at least one opening area for dividing at least a part of said pixel electrode into a plurality of sections in said first and second areas, said second alignment-controller is comprised of a second opening area of said second substrate where said opposing electrode does not exist, said opposing electrode is formed with a plurality of second opening areas in facing relation to each of said sections and/or a non-divided portion of said pixel electrode.

15. The liquid crystal display device as set forth in claim 13, wherein each of said second opening area and said pixel electrode is symmetrical about a longitudinal direction of said liquid crystal display device.

16. The liquid crystal display device as set forth in claim 14, wherein each of said sections in said first area is larger in area than each of said sections in said second area.

17. The liquid crystal display device as set forth in claim 3, wherein said opening area extends across a boundary between said first and second areas, and said pixel electrode in said first area is connected to said pixel electrode in said second area through at least one line-shaped pixel electrode.

18. The liquid crystal display device as set forth in claim 3, wherein said opening area is formed in one of said first and second areas, and is comprised of a first region located adjacent to said first or second area, a second region spaced away from said first region, and at least one line-shaped connection region connecting said first and second regions to each other.

19. The liquid crystal display device as set forth in claim 12, wherein said second opening area is comprised of a cross slit.

20. The liquid crystal display device as set forth in claim 12, wherein a center of said second opening area is in alignment with a center of said pixel electrode.

* * * * *